(12) United States Patent
Whalley et al.

(10) Patent No.: US 11,188,337 B2
(45) Date of Patent: Nov. 30, 2021

(54) MICRO-ARCHITECTURE DESIGNS AND METHODS FOR EAGER EXECUTION AND FETCHING OF INSTRUCTIONS

(71) Applicant: The Florida State University Research Foundation, Inc., Tallahassee, FL (US)

(72) Inventors: David Whalley, Tallahassee, FL (US); Soner Onder, Houghton, MI (US)

(73) Assignees: The Florida State University Research Foundation, Inc., Tallahassee, FL (US); Michigan Technological University, Houghton, MI (US)

( * ) Notice: Subject to any disclaimer, the term of this patent is extended or adjusted under 35 U.S.C. 154(b) by 0 days.

(21) Appl. No.: 16/588,692

(22) Filed: Sep. 30, 2019

(65) Prior Publication Data

US 2020/0104136 A1    Apr. 2, 2020

Related U.S. Application Data

(60) Provisional application No. 62/738,454, filed on Sep. 28, 2018.

(51) Int. Cl.
*G06F 9/38* (2018.01)
*G06F 9/448* (2018.01)
(Continued)

(52) U.S. Cl.
CPC ........ *G06F 9/3804* (2013.01); *G06F 9/30123* (2013.01); *G06F 9/3836* (2013.01);
(Continued)

(58) Field of Classification Search
CPC .... G06F 9/3804; G06F 9/4494; G06F 9/3836; G06F 9/3838; G06F 9/544; G06F 12/0802; G06F 9/30123; G06F 9/4887; G06F 12/0895; G06F 2212/452; G06F 12/0875; G06F 9/30072; G06F 9/3802; G06F 9/3814; G06F 2209/484; G06F 9/4881
(Continued)

(56) References Cited

U.S. PATENT DOCUMENTS 5,826,070 A * 10/1998 Olson ................. G06F 9/30094
712/222
6,112,019 A *  8/2000 Chamdani ............. G06F 9/3836
712/214
6,449,710 B1 *  9/2002 Isaman ............... G06F 9/30036
712/216
(Continued)

*Primary Examiner* — Shawn Doman
(74) *Attorney, Agent, or Firm* — Eversheds Sutherland (US) LLP

(57) ABSTRACT

Micro-architecture designs and methods are provided. A computer processing architecture may include an instruction cache for storing producer instructions, a half-instruction cache for storing half instructions, and eager shelves for storing a result of a first producer instruction. The computer processing architecture may fetch the first producer instruction and a first half instruction; send the first half instruction to the eager shelves; based on execution of the first producer instruction, send a second half instruction to the eager shelves; assemble the first producer instruction in the eager shelves based on the first half instruction and the second half instruction; and dispatch the first producer instruction for execution.

20 Claims, 3 Drawing Sheets

(51) Int. Cl.
  *G06F 9/54*    (2006.01)
  *G06F 12/0802* (2016.01)
  *G06F 9/30*    (2018.01)
  *G06F 9/48*    (2006.01)

(52) U.S. Cl.
  CPC .......... *G06F 9/3838* (2013.01); *G06F 9/4494* (2018.02); *G06F 9/4887* (2013.01); *G06F 9/544* (2013.01); *G06F 12/0802* (2013.01)

(58) Field of Classification Search
  USPC .............................. 712/18, 23, 25, 201, 216
  See application file for complete search history.

(56) References Cited

U.S. PATENT DOCUMENTS

| | | | |
|---|---|---|---|
| 6,785,802 B1* | 8/2004 | Roy .................... | G06F 9/3836 712/216 |
| 2006/0155965 A1* | 7/2006 | Altman ................ | G06F 9/3808 712/215 |
| 2009/0204792 A1* | 8/2009 | Luick ................... | G06F 9/3889 712/215 |
| 2010/0058035 A1* | 3/2010 | Abernathy ............ | G06F 9/3867 712/217 |
| 2014/0149715 A1* | 5/2014 | Inman ................ | G06F 15/17393 712/29 |
| 2015/0277916 A1* | 10/2015 | Khartikov ............ | G06F 9/3855 712/205 |
| 2017/0109172 A1* | 4/2017 | Sleiman ................ | G06F 9/3851 |
| 2018/0365016 A1* | 12/2018 | Luliano ................ | G06F 9/3867 |
| 2019/0034208 A1* | 1/2019 | Comparan ............ | G06F 9/3838 |
| 2019/0101952 A1* | 4/2019 | Diamond ............. | G06F 1/3243 |
| 2019/0236009 A1* | 8/2019 | Burger ................ | G06F 9/30043 |

* cited by examiner

MICRO-ARCHITECTURE DESIGNS AND METHODS FOR EAGER EXECUTION AND FETCHING OF INSTRUCTIONS

CROSS-REFERENCE TO RELATED APPLICATIONS

This application claims priority to U.S. Provisional Patent Application No. 62/738,454, filed Sep. 28, 2018, which is incorporated herein by reference.

STATEMENT REGARDING FEDERALLY SPONSORED RESEARCH AND DEVELOPMENT

This invention was made with government support under grant number 1823417 awarded by the National Science Foundation. The government has certain rights in the invention.

BACKGROUND

There have been studies conducted regarding the limitations of instruction-level parallelism (LLP). These studies have revealed one or more limitations associated with LLP technology, including the inability to fetch instructions that are candidates for being dispatched to execution units, long latency operations (such as loads that miss in the data cache), and the chain of dependencies between instructions that may mandate an order in which instructions are to be executed. There remains a need for a solution that mitigates or overcomes one or more of these limitations.

Figure 1:
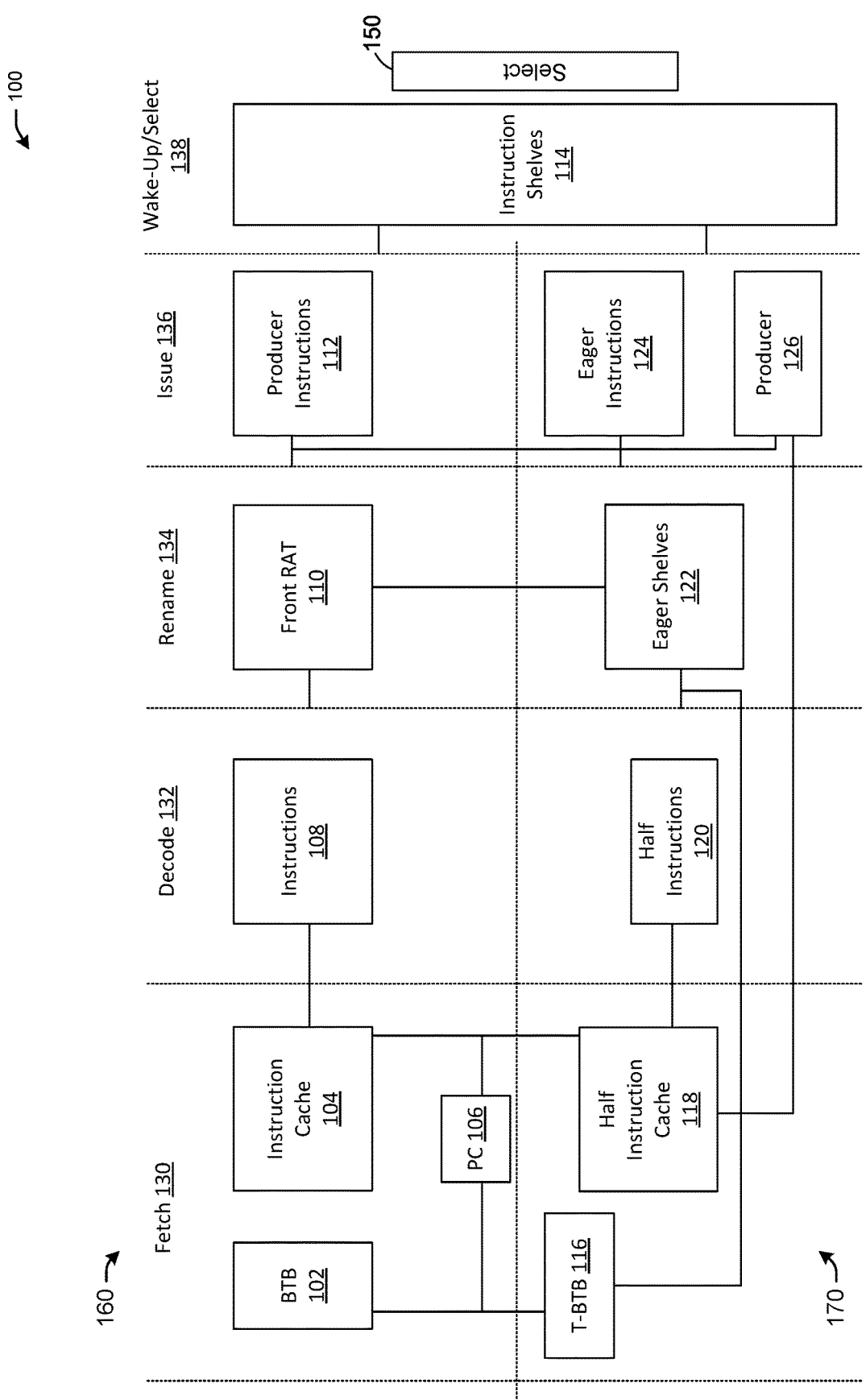
FIG. 1 illustrates an example architecture design for a dataflow-superscalar eager processor front-end, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art Like numbers in the figures refer to like elements throughout. Hence, if a feature is used across several drawings, the number used to identify the feature in the drawing where the feature first appeared will be used in later drawings.

DESCRIPTION

Example embodiments described herein provide certain systems, methods, and devices for micro-architecture design of computer processors. Provided herein are new micro-architecture designs and methods that may address one or more of the foregoing limitations.

In computer processing, instruction-level parallelism (ILP) may refer to the simultaneous execution of computer instructions. Superscalar processors, such as out-of-order processors (e.g., processors capable of executing instructions in an order that is different than the order of the instructions defined by a computer program), may perform ILP. Using eager execution, processors may execute operations immediately, mitigating bugs and undesirable effects that may be caused by out-of-order execution. Eager execution may allow for immediately dependent instructions to be delivered more quickly to functional units for execution. A device or system may detect the execution of instructions whose source register values have not changed since the previous execution of the respective instructions, and therefore may avoid redundant computation The producer-consumer problem in computing may refer to a multi-process synchronization problem. For example, a producer process and a consumer process may share a buffer or other storage. The producer process may generate data and store the data in the buffer. The consumer process may consume the data from the buffer. A problem may occur when the producer process attempts to store data in a buffer that is full, or when the consumer process attempts to consume data from an empty buffer. To avoid this problem, the producer process may enter a sleep mode or discard data when a buffer is full, and the consumer process may notify the producer process when the consumer process consumes data from the buffer, thereby allowing the producer process to add more data to the buffer. Likewise, the consumer process may enter a sleep mode when the buffer is empty, and the producer process may notify the consumer process when the producer process adds data to the buffer.

The efficiency of computer applications may be affected by single thread performance. Therefore, an eager execution technique may benefit applications executing on a variety of devices, such as mobile devices, and may benefit large data applications executing at data centers.

Some limitations of ILP may include an inability to fetch instructions that are candidates for dispatch to execution units, long latency operations (e.g., loads that miss in a data cache), and a chain of dependencies between instructions that may require an order in which instructions are to be executed. An ILP limitation associated with instruction fetching may include an issue window, which may refer to the set of fetched instructions that are candidates to be sent to execution units. Increasing the issue window size can have a detrimental effect, as instruction dispatch within a single cycle may become infeasible when using large window sizes.

Another fetch problem is associated with improperly predicted branches and the disruption in instruction flow because of taken transfers of control, as fetching from more than one target address in a single cycle is not always plausible. Therefore, filling of the issue window may be delayed due to improperly predicted branches and/or taken transfers of control.

Another significant ILP limitation may include the presence of data cache misses for load instructions. Load instructions may precede a sequence of instructions that may depend on the value to be loaded, and so an entire dependent sequence of instructions may be delayed until the loaded value is accessed. In addition, a single data cache miss may stall multiple loads that are accessing the same cache line. Some of these misses may be tolerated by schemes that support simultaneous data cache accesses. However, data cache misses remain an important ILP limitation.

Another significant ILP limitation may include a dependence height problem, which may be dictated by a presence of true dependencies between instructions that restrict the order in which the instructions can be dispatched for execution. The increased speed that may be obtained through any kind of parallel processing may be limited by a sequential component of the computation as dictated by Amdahl's law, for example. A sequential component for ILP may be a dependent instruction chain through a critical path in a given program.

Some computer instructions depend from preceding data. A dependent instruction may depend on the result of a sequentially previous instruction such that the dependent instruction may not be completed until another instruction is complete. A dependency graph may represent the dependencies of computer instructions with respect to one another. For example, a dependency graph may show that instruction A depends from instructions B and C, and that instruction C depends from instruction D. Many computer instructions rely one or two source values retrieved from registers. Directly fetching dependent instructions as soon as possible may allow for immediate dispatch of the dependent instructions once their respective source values are available. In this manner, rather than fetching a dependent instruction once a sequentially previous instruction from which a dependent instruction depends has been executed, the dependent instruction may be fetched without waiting for the previous instruction to execute, thereby reducing the time needed to complete execution of multiple instructions.

Therefore, a micro-architecture design of a computer processor may allow for improved early fetching of computer instructions and dispatching of dependent instructions.

In some embodiments, a micro-architecture design of a computer processor may combine a traditional superscalar processor architecture with a dataflow pipeline in which the dataflow pipeline allows for efficient early fetching and dispatching of computer instructions. The dependency graph for the dataflow may be generated dynamically as respective instructions are fetched and the operands are discovered by a superscalar processor. A level one instruction cache may store with any instruction one or more other instructions that use a register value that may be set by the level one instruction cache when a dependency is detected. A subsequent fetch of an instruction from the level one instruction cache may occur with simultaneous fetches of instructions that are immediately dependent on the instruction, and the dependent instructions may execute once their respective source operands are determined. When a result of a corresponding eager instruction may be used, then instructions that are fetched from the level one instruction cache may not be issued.

In some embodiments, the designs and methods herein permit immediately dependent consumer instructions to be more quickly delivered to functional units for execution. In some embodiments, the designs and methods herein permit the execution of instructions whose source register values have not changed since its last execution to be detected and redundant computation can be avoided.

In some embodiments, the dependency between a producer/consumer pair of instructions can sometimes be collapsed so they can be simultaneously dispatched for execution. In some embodiments, consumer instructions from multiple paths may be speculatively executed and their results can be naturally retained in the paradigm disclosed herein to avoid re-execution after a branch mis-prediction.

In some embodiments, critical instructions can be eagerly executed to improve performance, which include loads to pre-fetch cache lines and precomputation of branch results to avoid branch mis-prediction delays.

In some embodiments, rather than identifying independent instructions to dispatch, a processor may fetch a set of immediately dependent instructions as soon as possible to allow for eager dispatch of the dependent instructions once the source values of the dependent instructions are determined and available.

In some embodiments, the use of eager execution may mitigate the fetch problem. In particular, a processor may fetch dependent instructions across control dependencies and may retrieve instruction results before the instruction normally would have been executed. The processor may speculatively execute consumer instructions along multiple paths and, upon identifying an improper branch prediction (e.g., mis-prediction), instruction results may be used, allowing for reduced branch mis-prediction penalties.

Table 1 below provides an example of the use of eager execution.

TABLE 1

Eager Execution:

| Instruction | Code | Caching |
| --- | --- | --- |
| i0 | L0: $r2_1 = \ldots$ | +, $r4_2$, left |
| i1 | L1: $r3_1 = \ldots$ | +, $r4_2$, right |
| i2 | L2: $r4_1 = \ldots$ | |
| i3 | $\ldots = r4$ | |
| i4 | If(p0) then | |
| i5 | $r2_2 - \ldots$ | +, $r4_2$, left |
| i6 | If(p1) then | |
| i7 | $r4_2 = r2 + r3$ | |
| i8 | $\ldots = r4_2$ | |
| i9 | If(p2) goto L0 | |
| i10 | If(p3) goto L1 | |
| i11 | If(p4) goto L2 | |

In some embodiments, the eager execution approach dynamically may build a dataflow graph as a program executes, allowing producer instructions and consumer instructions depending from the producer instructions to be fetched together by caching instructions as they are encountered by using an instruction pointer (e.g., i1-i11 in Table 1) of producer instructions as an address key in a separate cache.

Referring to Table 1, during a fetch cycle, the current instruction address (e.g., i1-i11 in Table 1) may be supplied to multiple caches: a level one instruction cache, which supplies a producer instruction, and another cache, which supplies consumer instruction dependent from the producer instruction. When a producer instruction executes, any corresponding dependent instruction may have been fetched from the other cache and scheduled for execution before they appear in the regular instruction stream. If such eagerly executed consumer instructions are encountered in the regular fetch stream, they can be discarded without execution, but the dependent instructions of the consumers may begin start execution because their operands would be ready. As such, this eager execution approach dynamically and speculatively arranges a copy of an instruction at the earliest point where the instruction may be safely executed.

Still referring to Table 1, each logical register definition may have a static instance subscript, but otherwise names represent instruction set architecture (ISA) names. For example, when the candidate instruction for eager execution is i7, the instruction's left operand is produced by either i0 or i5, and the instruction's right operand is produced by i1. As the execution begins with i0, the producer instructions for the consumer i7 may be executed at least once, but subsequent execution may be dependent on the values of predicates p0, p2, p3, and p4. In subsequent iterations, the producers of i7 may or may not execute, and they may execute in an arbitrary order. For example, when both predicates p2 and p0 are true, the left operand producer may execute last before the consumer i7, whereas when predicate p2 is true and p0 is false, the right operand producer may execute last. The target instruction i7 is control-dependent on i6, so its execution may be dependent on whether predicate p1 is true. The compile-time range of hoisting of an instruction may be limited because the motion may be prevented by multiple control-dependencies (e.g., due to predicates p0 and p1) as well as instruction i5, which defines one of its operands.

In some embodiments, to address the challenges of eager execution, a scheduling and synchronization mechanism may be used. For example, each instruction that is scheduled for execution may be a consumer instruction and may be split into two half-instructions. Both of the half instructions may be stored in a cache referred to as a Half-Instruction Cache (HIC) at the corresponding positions to the operand producers. Each producer fetched from the IC may fetch only half of its consumer instruction from the HIC and send the fetched half instruction to a rendezvous point alongside with a corresponding destination register. When both producers execute, the rendezvous point may receive the two halves where the instruction can be reassembled and dispatched for execution. The problem that one or more producers may not execute the next time is inherently solved by realizing that the rendezvous point should include a copy of the previous instance of the instruction. When none of the producers execute the next time, the instruction may be invariant, and the instruction's result at the rendezvous point should be valid. If one or more of the producers execute, the instruction will be updated with the correct data dependencies and may be executed. Such an approach not only eagerly fetches dependent instructions, but also dynamically builds the correct data dependencies necessary for eager execution by using the current dynamic information (e.g., the previous operands of the instruction) and the dependence relationship stored in an instruction space. Referring to Table 1 and assuming that each of the definitions i0, i1, i5, and i7 has executed at least once, the resulting HIC contents may be as shown in the caching column of Table 1.

In some embodiments, the numbered logical destination of each instruction may be used as the rendezvous point, and a copy of each executed instruction alongside its result may be stored in a buffer referred to as an activation buffer at an index given by its destination identifier. When predicate p2 and p0 are both true with the given cache contents, as soon as the control is transferred to i0 by i9, i0 is fetched alongside with the half instruction +, $r4_2$; left. Using the information in the half-instruction (e.g., $r4_2$) as the meeting point and the flag left, the destination identifier of the producer instruction i0 (e.g., $r2_1$) may be stored to the left operand position of the cached copy of i7. When it is executed, it may sends its destination identifier $r3_1$ to the right operand of the stored copy of i7, triggering the execution of i7 right after the execution of i1. When predicate p0 is false and p1 is true, instruction i7 will be encountered again. At this point, it can check the rendezvous point to see if it has already been scheduled for execution. If so, i7 may be discarded, and i8 may be permitted to use the pre-computed value. Such a mechanism differs from a Monsoon processor, for example, because eager execution continues to visit instructions rather than only having the data motion trigger instruction execution.

Many modifications and other implementations of the disclosure set forth herein will be apparent having the benefit of the teachings presented in the foregoing descriptions, and the associated drawings. Therefore, it is to be understood that the disclosure is not to be limited to the specific implementations disclosed and that modifications and other implementations are intended to be included within the scope of the appended claims.

FIG. 1 illustrates an example architecture design 100 for a dataflow-superscalar eager processor front-end, in accordance with one or more example embodiments of the present disclosure.

Referring to FIG. 1, the architecture design 100 (e.g., a processing architecture) may include a branch target buffer (BTB) 102, an instruction cache 104, a program counter (PC) 106, instructions 108, a front register alias table (RAT) 110, producer instructions 112, instruction shelves 114, a tiny BTB (T-BTB) 116, a half-instruction cache 118, half instructions 120, eager shelves 122, eager instructions 124, and a producer 126. The BTB 102, the instruction cache 104, the PC 106, the instructions 108, the front RAT 110, and the producer instructions 112 may form a superscalar path 160. The T-BTB 116, the half-instruction cache 118, the half instructions 120, the eager shelves 122, the eager instructions 124, and the producer 126 may form dataflow path 170. A fetch operation 130 may include the BTB 102, the instruction cache 104, the PC 106, the T-BTB 116, and the half-instruction cache 118. A decode operation 132 may include the instructions 108 and the half instructions 120. A rename operation 134 may include the front RAT 110 and the eager shelves 122. An issue operation 136 may include the producer instructions 112, the eager instructions 124, and the producer 126. A wake-up/select operation 138 may include the instruction shelves 114 and select logic 150.

The architecture design 100 may facilitate implementation of eager execution operations. Eager execution may be implemented efficiently by extending only the front-end of a typical superscalar micro-architecture to include a parallel pipeline. The architecture design 100 has a number of desirable properties to facilitate eager execution operations. In particular, an eager execution path in a parallel pipeline may allow the superscalar processor using the architecture design 100 to retain much of the conventional operation, and permits the eager instructions 124 that to establish their dependencies from the producer instructions 112 through a modified renaming process (e.g., the rename operation 134) before being issued (thus, the dataflow style execution of the eager instructions 124 may be integrated seamlessly with a conventional superscalar operation. Use of the parallel pipeline operating in dataflow style may allow for efficient scheduling of instructions to be pre-computed. The two pipelines (e.g., the superscalar path 160 and the dataflow path 170) may merge at the instruction shelves 114 (e.g., instruction shelving buffers, such as reservation stations) to utilize superscalar execution units.

Referring to the architecture design 100, gating the accesses to half-instruction cache 118 may stop the dataflow path 170, and the remainder of the dataflow path 170 may be powered down when high performance is not desired, or when power is at a premium. When enabled, the dataflow path 170 only contributes to performance and may not make the superscalar path 160 execute more slowly with optimization, provided that the selection of the instructions 108 favors the superscalar path 160. The architecture design 100 may resemble some simultaneous multithreading (SMT) pipelines, but some SMT pipelines may use a single thread of control, and both the dataflow path 170 and the traditional superscalar path 160 of the architecture design 100 may improve the thread's performance.

In some embodiments, the eager instructions 124 may not require a separate reorder buffer or entries in a conventional re-order buffer. The back-end of the pipeline in the architecture design 100 may be identical to a conventional superscalar design. Pre-computed values may be used when an eagerly executed instruction (e.g., of the eager instructions 124) is fetched by the regular data path based on a program order. When the corresponding eager shelf (e.g., of the eager shelves 122) includes an executed instruction (e.g., of the eager instructions 124), the execution result of the instruction and any associated exception information may be copied into a reorder buffer entry allocated for the instruction. The remainder of the exception handling may maintain a free register pool, which may be a split register pool in which a portion of the registers are used by the eager instructions 124. The eager instructions 124 may be allocated a physical register from their pool when they are issued from the eager shelves 122 into reservation stations. Allocated registers for the eager instructions 124 may remain allocated as long as a respective instruction remains in its shelf.

In some embodiments, the eager shelves 122 implement activation-buffers. In traditional reservation stations, an instruction may be issued into any empty slot, whereas with the eager shelves 122, the allocation of entries is performed directly using a decoder, as there may be only one position into which an instruction can be deposited (e.g., the rendezvous point).

The architecture design 100 may support logical register based rendezvous points. By introducing a translation step before the eager shelves 122 are accessed, the architecture design 100 may support either a physical register-based implementation, or an implementation which uses a subset of physical registers. In some reservation stations, a broadcasted tag enables instructions. For example, when a broadcast tag matches the entry tag, it signifies to the instruction that the corresponding operand is ready. With the eager shelves 122, a tag match may clear the corresponding tag in the entry, meaning that the operand may become obsolete and unavailable. The new operand for the instruction may be received from the half-instruction cache 118 (e.g., the dataflow path 170) before the instruction can be executed. Such may be accomplished by broadcasting the prior physical register numbers of the instructions 108. In some superscalar processors, prior physical register numbers may be obtained from front-RAT 110 in order to release physical registers at retire time. Therefore, the required information for invalidation may be available at the rename operation 134 of the superscalar flow.

Because branch instructions may not have assigned destination registers, even in a design which implements rendezvous points using destination register identifiers, branch instructions may need to use the actual rendezvous points, which may be instruction addresses. Therefore, it may be beneficial to provide a mechanism to implement the shelving operations for branch instructions. One mechanism may include providing a fully associative, small BTB for eagerly executed branches, such as the T-BTB 116. Each entry in the T-BTB 116 may organized similarly to an eager shelf of the eager shelves 122 and may be used to store the eager instructions 124. The T-BTB 116 may be invalidated through prior register information similar to the eager shelves 122. In the T-BTB 116, a full instruction address may be stored instead of a destination register field and opcode fields. Contrary to some BTBs that hold target addresses, the address given by the T-BTB 116 may be the next PC 106 value. When an eagerly executed branch result is not taken, the T-BTB 116 may store the address of the next sequential instruction in this part of the entry. When the branch result is taken, the address of the target instruction may be stored in the T-BTB 116. A hit in the T-BTB 116 may permit directly using the computed branch outcome, overriding the branch predictor and the BTB 102 supplied information. The control-flow instructions within loops quickly may populate the T-BTB 116 and eliminate a significant number of branch mis-predictions, provided the eager computation is timely. The effectiveness of such an approach may be enhanced by spreading the computation instructions for the branch comparison well before the branch instruction so that the eagerly executed branch may compute the next PC 106 value earlier. One may include software pipelining. The approach of storing the next PC 106 value in the T-BTB 116 also may work seamlessly for eagerly executed indirect jumps and calls because the indirect target address may be stored in the T-BTB 116. Because of the built-in redundancy detection mechanism, eagerly fetched branch instructions with unchanged source operands may not be reevaluated. Any cycle newly renamed instructions may read the corresponding rendezvous point to determine whether there is an eager version of the instruction that has already executed. If so, that instruction may assume the destination register of the eager instruction and may not be issued.

The producer 126 may include a table (e.g., a producer instruction pointer, PIP). Creation of entries in the half-instruction cache 118 may incorporate the PIP, which may be a mapping table that maps physical register numbers to instruction addresses. The number of entries of the PIP may equal the number of physical registers that the architecture design 100 has, and any respective entry may include the instruction address of the producer instruction which has that physical register as its destination. Any issued instruction indexes into the PIP table with its physical register number, and assigns a portion of its instruction address in the PIP table. Any entry may include the full instruction address of the producer instruction. For any source register, the architecture design 100 may index in the PIP table using the physical register number of the source register to obtain the instruction address, which may be used to access the half-instruction cache to store a half instruction (e.g., of the half instructions 120) for the consumer at the producer's location. Based on the PIP information, the architecture design 100 may implement the half-instruction cache 118 update path which may fill the half-instruction cache 118 with the half instructions 120. In any cycle, any instructions which are being issued into the processor's main shelving buffers may obtain the instruction address (e.g., PC value) of the respective producer instructions 112 by supplying their source register identifiers to the PIP. Any instruction may be split into two halves, and each half may be written onto half-instruction cache 118 at the corresponding instruction address position. Once the entries are created, the next time the producer instructions 112 are fetched by the regular instruction fetch path, they may trigger eager execution of the current batch of instructions.

In some embodiments, a pipeline operation using the architecture design 100 may use two separate pools of free registers. An eager instruction free pool (EIFP) mat provide physical registers to eagerly executing instructions. EIFP registers may be allocated on a round-robin basis without being removed from the pool when they are assigned. A recently executing eager instruction (e.g., of the eager instructions 124) may steal the physical register from the oldest eager instruction in the eager shelves 122. For any regular path instruction, the operation may resemble a conventional pipeline operation up to the rename operations 134. A regular path instruction may have its source registers renamed. In parallel, the architecture design 100 may access the eager shelves 122 to determine whether the architecture design 100 has eagerly executed and already completed an eager execution (e.g., the entry is in issued state). If so, instead of the allocated physical register from the free pool, the physical register assigned to the eager execution may be copied to the instruction, and the instruction may discarded after updating its reorder buffer entry with any associated exception. In this manner, instructions which are dependent on a current instruction may be made dependent on the eager instruction result. When an eager instruction result is used in this manner, the physical register may be removed from an EIFP and inserted into the regular pool. A retiring instruction may return a free register to the EIFP to keep it at roughly the same number later. When a result is used from the eager instructions 124, the physical register may be provided to the regular path. When the regular path has a free register, the architecture design 100 may return the free register to the EIFP. After renaming, the instruction may issue to a reservation station when there is no eager instruction reuse.

Because the half instructions 120 may be in the half-instruction cache 118, the half instructions 120 may be written first to their rendezvous points. A half instruction may be allocated a physical register from an EIFP and may be written to an entry of the eager shelves 122. During these updates, some of the shelve entries change their state to "ready." The select logic 150 of the architecture design 100 may select an entry and issue the instruction to the instruction shelves 114.

Figure 2:
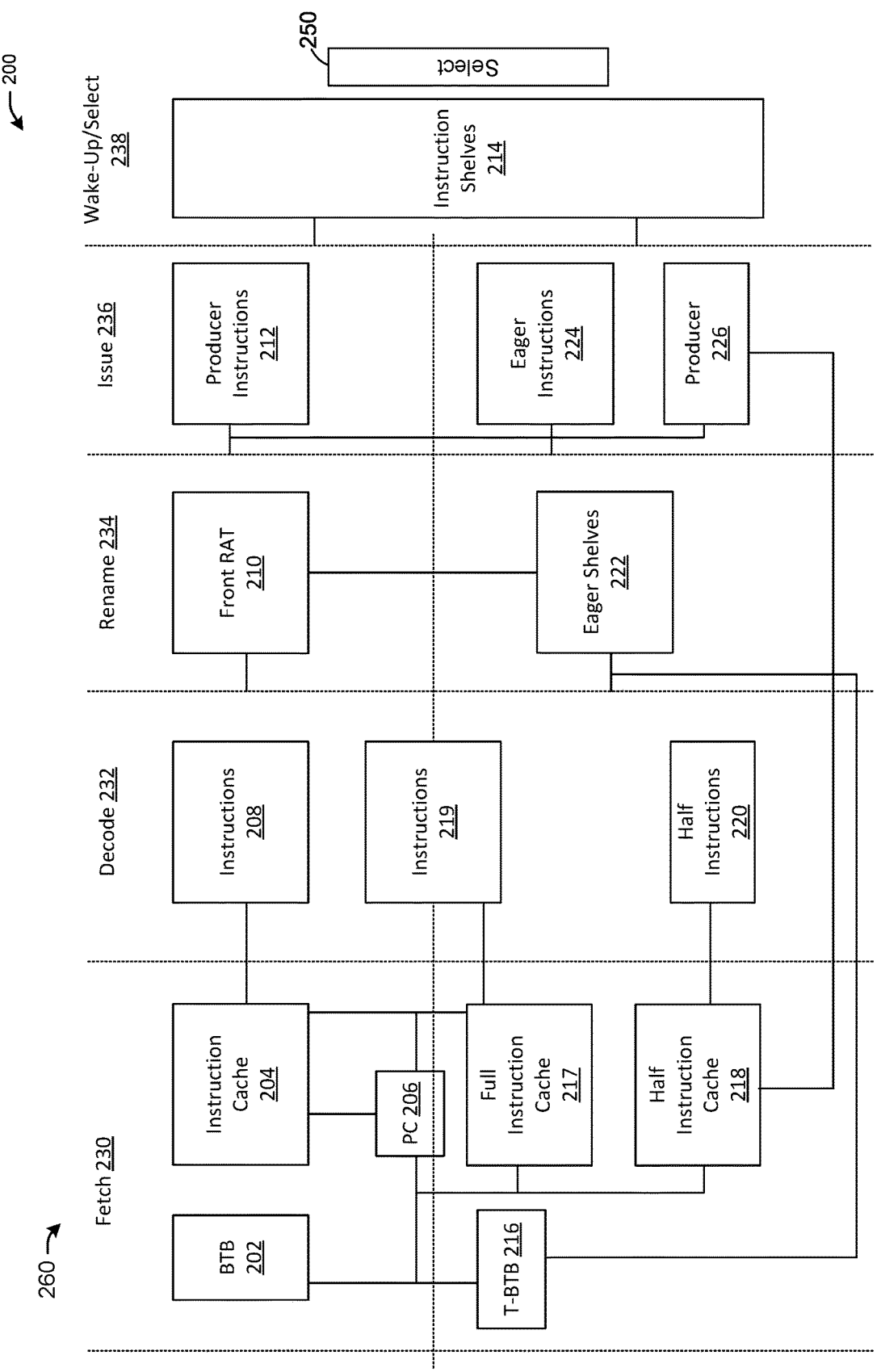
FIG. 2 illustrates an example architecture design for a dataflow-superscalar eager processor front-end with a full-instruction cache, in accordance with one or more example embodiments of the present disclosure.

FIG. 2 illustrates an example architecture design 200 for a dataflow-superscalar eager processor front-end with a full-instruction cache, in accordance with one or more example embodiments of the present disclosure.

Referring to FIG. 2, the architecture design 200 (e.g., a processing architecture) may include a BTB 202, an instruction cache 204, a PC 206, instructions 208, a front RAT 210, producer instructions 212, instruction shelves 214, a T-BTB 216, a full-instruction cache 217, a half-instruction cache 218, instructions 219, half instructions 220, eager shelves 222, eager instructions 224, and a producer 226. The BTB 202, the instruction cache 204, the PC 206, the instructions 208, the front RAT 210, and the producer instructions 212 may form a superscalar path 260. The T-BTB 216, the full-instruction cache 217, the half-instruction cache 218, the half instructions 220, the eager shelves 222, the eager instructions 224, and the producer 226 may form dataflow path 270. A fetch operation 230 may include the BTB 202, the instruction cache 204, the PC 206, the T-BTB 216, the full-instruction cache 217, and the half-instruction cache 218. A decode operation 232 may include the instructions 208, the instructions 219, and the half instructions 220. A rename operation 234 may include the front RAT 210 and the eager shelves 222. An issue operation 236 may include the producer instructions 212, the eager instructions 224, and the producer 226. A wake-up/select operation 238 may include the instruction shelves 214.

In some embodiments, inclusion of the full-instruction cache 217 into the dataflow path 170 may allow the architecture design 200 to be optimized for different needs of instruction types, and may exploit a prefetching mechanism.

The architecture design 200 may use the fetch operation PC 206 to access the T-BTB 216, the BTB 202, the half-instruction cache 218, and the full-instruction cache 217 in parallel. When there is a full-instruction cache 217 hit, the instruction obtained may be decoded and passed onto the rename operation. The full-instruction cache 217 path instructions whose results are ignored may be steered directly to the main instruction shelves 214 after renaming. When full-instruction cache 217 path instructions execute, their results may be discarded and their exceptions ignored. These instructions may be load instructions acting as their own pre-fetch instructions. Any other full-instruction cache 217 path instruction may require a rendezvous point to verify and extract the eagerly computed result. Therefore, the full-instruction cache 217 may follow the same path as the half instructions 218, except that once written into the eager shelves 222, the resulting entry may become immediately "ready" and may be input to select logic 250 for execution.

In some embodiments, the elements of the architecture design 200 of FIG. 2 may perform functions similar to the corresponding elements of the architecture design 100 of FIG. 1.

Referring to FIG. 1 and FIG. 2, a producer instruction may have a single slot in either a half-instruction cache or a full-instruction cache (e.g., FIG. 2), which may correspond to a dependent consumer instruction. While there may a large number of instructions for a single consumer, there may be a small number of dynamic instructions with a large number of consumers. Therefore, a carefully balanced design strategy may be employed in terms of the number of consumers permitted for each entry in a respective half-instruction cache or full-instruction cache. Some of the consumers of a given producer may be further away than other consumers, and it may be beneficial to favor some consumer over other consumers. A predictor may predicts the distance of the consumers to a given producer, and may favor more distant producers through dynamic steering (e.g., may select one producer over another given the distance of the producer from a consumer).

Still referring to FIG. 1 and FIG. 2, a property of eager execution with the micro-architecture design (e.g., the architecture design 100 of FIG. 1 and the architecture design 100 of FIG. 2) is the ability to retain values across branch mis-predictions, as a built-in invalidation mechanism may ensure that an eagerly executed value is still valid after a branch mis-prediction and restart. Some designs may include a branch mis-prediction that only flushes the regular superscalar pipeline, but retains contents of the eager shelves 122 or the eager shelves 222. After a mis-prediction recovery is complete and correct path instructions are being fetched, any control and data independent (CIDI) eagerly executed instruction may still be valid. When the instruction stream visits the rendezvous point, it can reuse the result. Although these instructions may still be re-fetched, after the mis-prediction recovery is complete, the code that executes may have its dependence height significantly reduced in comparison to a processor which does not perform eager execution. In particular, the reuse of instructions after a mis-prediction recovery is not even limited to CIDI instructions. For example, an if-then-else statement inside a loop may be executed repeatedly. When each path is exercised once and multiple consumer entries are permitted, half-instruction cache entries for consumer instructions on multiple paths may be populated. For example, the loop may include r7 with a path to r7+r5 and with another path to r8−r7. The resulting eager execution may include both r7+r5 and r8–r7 (e.g., execution of both paths). The program may execute instructions from both paths. One of the instructions may not be used if there is no branch mis-prediction, since the control flow may not visit that path. When there is a branch mis-prediction and the other path is fetched (e.g., a predicted path of the loop does not occur), the processor will end that the corresponding instruction on the path has already executed. The reason for this behavior is eager execution's ability to lift instructions across control dependencies. Although this may require energy, the eager execution method may reduce branch mis-prediction penalties.

It may possible to fuse two single cycle integer arithmetic logic unit (ALU) operations any time that a producer/consumer pair of instructions is to be executed. Two cascaded ALUs directly connected to one another may execute in a single cycle because the two ALUs may operate at double the frequency due to the intermediate value between the two dependent operations not being bypassed. Rather than requiring that the producer corresponds only to a single consumer, a producer instruction may be dispatched to an execution unit, and simultaneously the producer/consumer pair may be dispatched to a cascaded ALU that may not generate an intermediate result from the producer. When it is feasible to fuse many producer/consumer computations in a single cycle, then there may be a potential to reduce the dependence height and improve performance.

Fusing instructions using cascaded ALUs may not be feasible in a single cycle for some implementations. The hardware logic in a dataflow path may rewrite a consumer instruction to break the dependence with the corresponding producer instruction, allowing the producer and the consumer to be simultaneously dispatched for execution. Table 2 below shows an example of eliminating a dependence via constant folding.

TABLE 2

Eliminating a Dependence via Constant Folding:

| Example Loop | First Producer/<br>Consumer Pair | Second Producer/<br>Consumer Pair |
| --- | --- | --- |
| L1: r2 = M[r3]<br>r3 = r3 + 4<br>PC = r3 != r4, L1 | Producer: r3 = r3 + 4<br>Original Consumer: r2 = M[r3]<br>New Consumer: r2 = M[r3@4] | Producer: r3 = r3 + 4<br>Original Consumer: r3 = r3 + 4<br>New Consumer: r3 = r3 @ +8 |

Referring to Table 2, the example loop includes code that progresses through elements of an array. A first producer/consumer pair shown is between the increment and the load instruction. However, load instructions in some industry standard architectures (ISAs) support a displacement addressing mode. Thus, the load instruction in the full-instruction cache may be transformed to add the constant associated with the right operand of the increment instruction to the displacement within the load instruction. The left operand (r3) of the load instruction in the FIC is annotated, and the annotation is depicted with a @ character in Table 2, to indicate that the value of r3 should come from the left source operand value of the producer rather than the destination value of the producer. Likewise, the other producer/consumer pair shown in the second producer/consumer column of Table 2 is between one iteration of the increment instruction and the next iteration of the same increment instruction. The consumer is annotated to use the producer's left source operand value, and the two constant right operands may be added together to produce the transformed right constant operand of the new consumer. The example of Table 2 shows that eager execution may dynamically provide some of benefits as loop unrolling when statically performed by a compiler. The dynamic constant folding technique allows both the producer and the consumer instructions to be independent and simultaneously dispatched to execution units, which reduces the dependence height.

The rewriting of the consumer instruction in the second producer/consumer pair of Table 2 may occur when the processor examines a specific producer/consumer pair after the consumer is being assigned to a full-instruction cache (e.g., the full-instruction cache 217 of FIG. 2). When the two instructions with a constant right operand both apply the same ALU operation, then the processor may eliminate the dependence between the producer/consumer pair when the two instructions both have constant right operands. The two ALU operations in the producer/consumer pair may be associative. The processor may perform the ALU operation on the constant operands and properly adjust the consumer instruction so that it is now independent of the producer, allowing the two instructions to be simultaneously dispatched for execution. The effect of merging the producer and original consumer (e.g., the two instances of the increment) in Table 2 to be r3=(r3+4)+4 shows why the transformation is possible. By the associative law of addition, an equivalent effect of the merged operation may be r3=r3+(4+4), which may be simplified to be r3=r3+8. The effective address calculation of a load or a store instruction with a displacement addressing mode may be considered to be an integer immediate addition operation. For left and right shift immediate operations (and a subtract immediate if such an operation exists in the ISA), the constants may have to be added together. Producer/consumer pairs of add immediate operations may be the common case for applying the constant folding transformation.

When a producer/consumer pair includes two binary operations, there are multiple possible distinct source values that may be input to the producer/consumer pair as the consumer is instead dependent on the producer's result. For example, using the code sequence in Table 3 below, and using the original producer/consumer pair including the third and fourth instructions in Table 3, there are three distinct input values to this producer/consumer pair in r4, r5, and r7. When the values of r4 and r7 are available, but the value of r5 is currently unavailable due to a cache miss associated with the second load instruction in the example code sequence of Table 3. The effect of merging the producer/consumer pair may be r8=(r5+r4)+r7, which may be rewritten as r8=r5+(r4+r7) due to the associative law of addition. An intermediate operation may be immediately dispatched to an execution unit to determine the sum of available values of r4 and r7, as shown in the revised producer/consumer pair of Table 3, where "SUM" may be a newly allocated physical register. When the value of r5 becomes available, both the producer instruction and the new consumer instruction may be dispatched simultaneously for execution. Thus, when a producer/consumer pair is stalled due to only one of its operands being unavailable, the processor may perform this transformation to collapse the dependence between the producer/consumer pair.

TABLE 3

Eliminating Dependence by Issuing an Intermediate Operation:

| Example Code Sequence | Original Producer/ Consumer | Revised Producer/ Consumer |
| --- | --- | --- |
| L1: r4 = M[r2] | | |
| r5 = M[r3] | | Intermediate operation: SUM = r4 + r7 |
| r6 = r5 + r4 | Producer: r6 + r5 + r4 | Producer: r6 = r5 + r4 |
| r8 = r6 + r7 | Original consumer: r8 = r6 + r7 | New Consumer: r8 = r5 + SUM |

Figure 3:
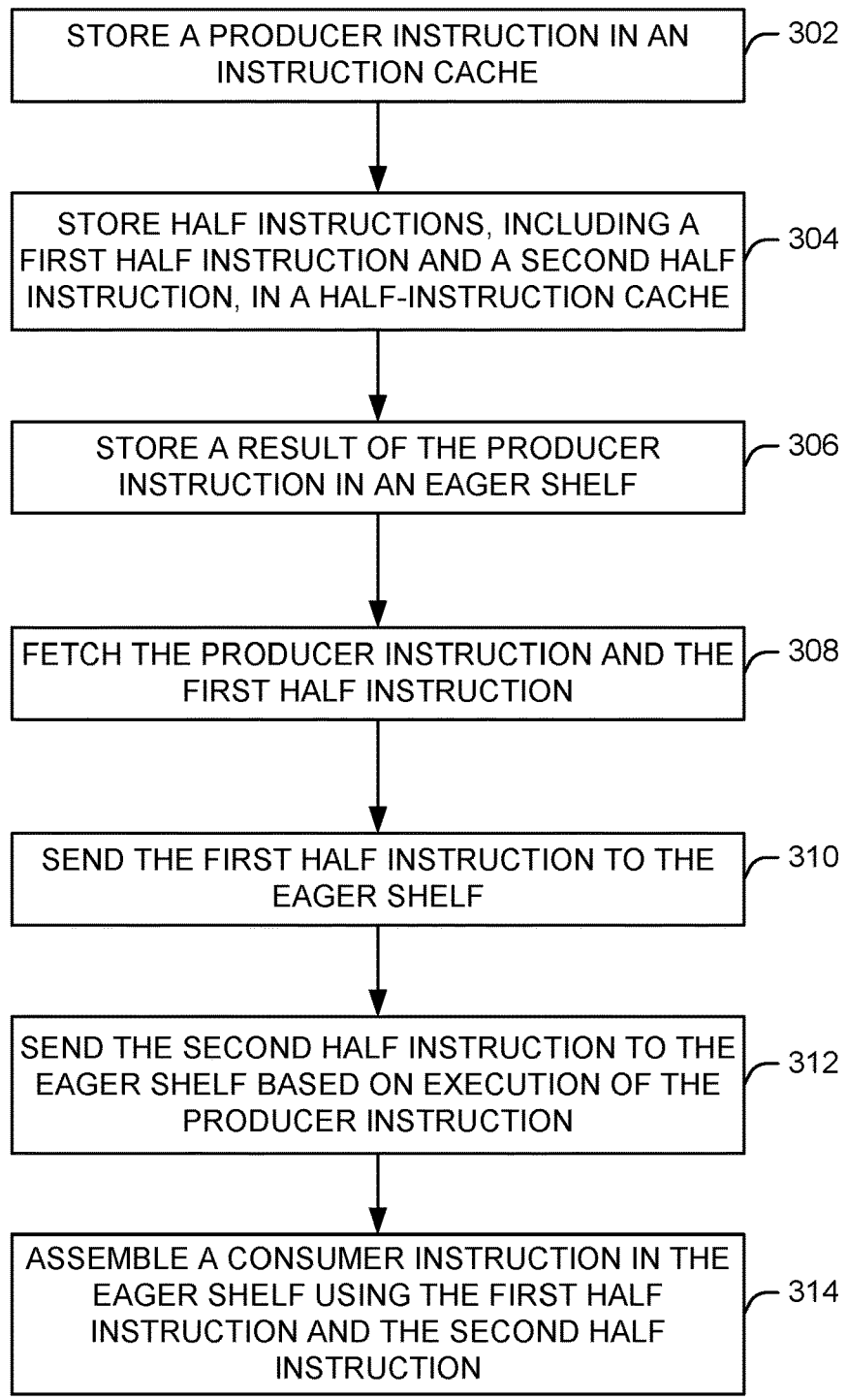
FIG. 3 illustrates a flow diagram for a process for using early fetching and dispatching dependent computer instructions, in accordance with one or more example embodiments of the present disclosure.

FIG. 3 illustrates a flow diagram for a process 300 for using early fetching and dispatching dependent computer instructions, in accordance with one or more example embodiments of the present disclosure.

At block 302, a computer processing architecture (e.g., the architecture design 100 of FIG. 1, the architecture design 200 of FIG. 2, an associated system, etc.) may store producer instructions in an instruction cache (e.g., instruction cache 104 of FIG. 1, instruction cache 204 of FIG. 2). The producer instructions may have operands and program addresses. The instruction cache may be a level-one cache. One or more instruction may be dependent from the producer instructions (e.g., consumer instructions).

At block 304, the computer processing architecture may store half instruction in a half-instruction cache (e.g., the half-instruction cache 118 of FIG. 1, the half-instruction cache 218 of FIG. 2). The half-instructions may be halves of a consumer instruction that depends from a producer instruction. The half-instruction cache may be part of a dataflow path (e.g., the dataflow path 170 of FIG. 1, the dataflow path 270 of FIG. 2), and the instruction cache may be part of a superscalar path (e.g., the superscalar path 160 of FIG. 1, the superscalar path 260 of FIG. 2).

At block 306, the computer processing architecture may store a result of the first producer instruction in an eager shelf (e.g., the eager shelves 122 of FIG. 1, the eager shelves 222 of FIG. 2). For example, when an instruction executes, the result of the instruction may be stored in the eager shelf.

At block 308, the computer processing architecture may fetch a producer instruction and half of its consumer instruction (e.g., a first half instruction of the half instructions).

At block 310, the computer processing architecture may send the fetched half instruction to the eager shelf. For example, any producer fetched from the instruction cache may fetch only half of its consumer instruction from the half-instruction cache, and may send the fetched half instruction to a rendezvous point (e.g., using an eager shelf) alongside its destination register.

At block 312, the computer processing architecture may, based on execution of the producer instruction, send the other half instruction to the eager shelf. For example, when producer instructions execute, the rendezvous point (e.g., using the eager shelf) may receive the two halves (e.g., halves of a consumer instruction), and the consumer instruction may be reassembled and dispatched for execution at block 314.

In some embodiments, the architecture design 100 of FIG. 1, the architecture design 200 of FIG. 2, and/or the process 300 may be implemented in one or more processing devices or systems associated with a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

We claim:

1. A computer processing apparatus comprising:
an instruction cache storing producer instructions;
a half-instruction cache storing half instructions, wherein a consumer instruction dependent on a first producer instruction of the producer instructions comprises a first half instruction of the half instructions and a second half instruction of the half instructions; and
eager shelves storing a result of the first producer instruction, wherein the computer processing apparatus is configured to:
fetch the first producer instruction;
based on fetching the first producer instruction, fetch the first half instruction;
prior to execution of the first producer instruction, send the first half instruction to the eager shelves;
execute the first producer instruction;
based on the execution of the first producer instruction, send the second half instruction to the eager shelves;
assemble the consumer instruction in the eager shelves based on the first half instruction and the second half instruction; and
dispatch the consumer instruction for execution.

2. The computer processing apparatus of claim 1, further comprising a superscalar path and a dataflow path.

3. The computer processing apparatus of claim 2, wherein the superscalar path comprises the instruction cache.

4. The computer processing apparatus of claim 2, wherein the dataflow path comprises the eager shelves and the half-instruction cache.

5. The computer processing apparatus of claim 2, wherein the dataflow path comprises a full-instruction cache storing dependent instructions.

6. The computer processing apparatus of claim 2, wherein the dataflow path comprises a producer instruction pointer mapping physical register numbers to instruction addresses.

7. The computer processing apparatus of claim 2, further comprising instruction shelves associated with the superscalar path and the dataflow path.

8. The computer processing apparatus of claim 1, further comprising:
a first branch target buffer storing target addresses associated with the producer instructions; and
a second branch target buffer storing eagerly executed branch instructions, the second branch target buffer smaller than the first branch target buffer.

9. The computer processing apparatus of claim 8, wherein the second branch target buffer further stores a full instruction address.

10. The computer processing apparatus of claim 9, further comprising a program counter, wherein the full instruction address is a next value of the program counter.

11. A method, comprising:
storing producer instructions in an instruction cache;
storing half instructions in a half-instruction cache, wherein a consumer instruction dependent on a first producer instruction of the producer instructions comprises a first half instruction of the half instructions and a second half instruction of the half instructions;
storing a result of the first producer instruction in one or more eager shelves;
fetching the first producer instruction;
based on fetching the first producer instruction, fetching the first half instruction;
prior to execution of the first producer instruction, sending the first half instruction to the eager shelves;
executing the first producer instruction;
based on the execution of the first producer instruction, sending the second half instruction to the eager shelves;
assembling the consumer instruction in the eager shelves based on the first half instruction and the second half instruction; and
dispatching the consumer instruction for execution.

12. The method of claim 11, wherein the instruction cache is associated with a superscalar path of a computer processing architecture.

13. The method of claim 11, wherein the eager shelves and the half-instruction cache are associated with a dataflow path of a computer processing architecture.

14. The method of claim 13, wherein the dataflow path comprises a full-instruction cache, further comprising storing dependent instructions in the full-instruction cache.

15. The method of claim 13, wherein the dataflow path comprises a producer instruction pointer, further comprising mapping physical register numbers to instruction addresses using the producer instruction pointer.

16. The method of claim 11, further comprising:
storing target addresses associated with the producer instructions in a first branch target buffer; and
storing eagerly executed branch instructions in a second branch target buffer smaller than the first branch target buffer.

17. The method of claim 16, further comprising storing a full instruction address in the second branch target buffer.

18. A system, comprising:
a superscalar path of a computer processing architecture, the superscalar path comprising an instruction cache storing producer instructions; and
a dataflow path of the computer processing architecture, the dataflow path comprising:
a half-instruction cache storing half instructions, wherein a consumer instruction dependent on a first producer instruction of the producer instructions comprises a first half instruction of the half instructions and a second half instruction of the half instructions; and
eager shelves storing a result of the first producer instruction, wherein the system is configured to fetch the first producer instruction, wherein fetching the first producer instruction causes fetching the first half instruction and, prior to execution of the first producer instruction, sending the first half instruction to the eager shelves, executing the first producer instruction, and wherein executing the first producer instruction causes assembling the consumer instruction based on the first half instruction and the second half instruction and dispatching the consumer instruction for execution.

19. The system of claim 18, wherein the dataflow path further comprises a full-instruction cache storing dependent instructions.

20. The system of claim 18, wherein the dataflow path further comprises a producer instruction pointer mapping physical register numbers to instruction addresses.

* * * * *